United States Patent
Medina, III et al.

(10) Patent No.: US 9,799,076 B1
(45) Date of Patent: *Oct. 24, 2017

(54) SYSTEMS AND METHODS FOR HIT AND RUN DETECTION BASED ON INTELLIGENT MICRO DEVICES

(71) Applicant: UNITED SERVICES AUTOMOBILE ASSOCIATION (USAA), San Antonio, TX (US)

(72) Inventors: Reynaldo Medina, III, San Antonio, TX (US); Michael P. Bueche, Jr., San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/598,613

(22) Filed: Jan. 16, 2015

Related U.S. Application Data

(63) Continuation of application No. 13/526,086, filed on Jun. 18, 2012, now Pat. No. 8,957,759, which is a continuation of application No. 12/250,030, filed on Oct. 13, 2008, now Pat. No. 8,203,425.

(51) Int. Cl.
| | |
|---|---|
| G05B 19/00 | (2006.01) |
| G06Q 40/08 | (2012.01) |
| G06F 17/30 | (2006.01) |
| B82Y 10/00 | (2011.01) |

(52) U.S. Cl.
CPC ....... G06Q 40/08 (2013.01); G06F 17/30312 (2013.01); B82Y 10/00 (2013.01)

(58) Field of Classification Search
CPC combination set(s) only.
See application file for complete search history.

(56) References Cited

U.S. PATENT DOCUMENTS

| | | | | |
|---|---|---|---|---|
| 7,317,397 | B2 * | 1/2008 | Gunsauley | G08G 1/017 340/10.1 |
| 8,203,425 | B1 * | 6/2012 | Medina, III | G08G 1/017 118/663 |
| 8,957,759 | B1 * | 2/2015 | Medina, III | G08G 1/017 118/663 |
| 2006/0006982 | A1 * | 1/2006 | Gunsauley | G08G 1/017 340/5.8 |
| 2007/0059442 | A1 * | 3/2007 | Sabeta | B44D 3/003 427/142 |
| 2008/0174423 | A1 * | 7/2008 | Breed | B60N 2/002 340/539.22 |

* cited by examiner

*Primary Examiner* — Travis Hunnings
(74) *Attorney, Agent, or Firm* — Baker Hostetler LLP

(57) ABSTRACT

A system, method, and computer-usable medium are disclosed for providing information relating to damage incurred by a vehicle in an accident. A first plurality of markers with a first set of identifiers is embedded in a coating applied to a component of a first vehicle and a second plurality of markers with a second set of identifiers is embedded in a coating applied to a component of a second vehicle. Markers from the first vehicle are transferred to the second vehicle upon impact during an accident. The transferred markers are read by a marker reader and then processed to determine the identity of the first vehicle.

16 Claims, 8 Drawing Sheets

| Vehicle Repair History 1302 | | | | | | | | | |
|---|---|---|---|---|---|---|---|---|---|
| Year 1304 | 2009 | Make 1306 | Reliance | Model 1308 | Impacta | VIN # 1310 | FJ235895KK4525L23 | | |
| Date 1312 | Component 1314 | Part # 1316 | Manufacturer 1318 | Identifier 1320 | Supplier 1322 | Repaired By 1324 | Location 1326 | | |
| 2-14-2012 | Right Fender | F1254 | Reliance OEM | 03596FA23h | Reliance OEM | Memphis Reliance | Memphis, TN | | |
| | Right Fender Trim | F1254T | Reliance OEM | 022AC9544h | Reliance OEM | Memphis Reliance | Memphis, TN | | |
| | Turn Ind. Light | T4556ll | Reliance OEM | 036BDF120h | Reliance OEM | Memphis Reliance | Memphis, TN | | |
| 2-15-2012 | Wheel | W3356GA | Reliance OEM | 037FA5423h | Reliance OEM | Alignment Plus | Memphis, TN | | |
| | Lower Control Arm | LCA4554 | Super Chassis | 0111DC617h | Super Chassis | Alignment Plus | Memphis, TN | | |
| | Strut | ST5585 | Monroe | 0444DE829h | Super Chassis | Alignment Plus | Memphis, TN | | |
| 7-8-2014 | Front Bumper | FB4556 | Exact Match | 33D25FB43h | Body Supply | Dents And More | Atlanta, GA | | |
| | Bumper Shk. Abs. | BSA45 | Monroe | 044FFAF32h | NAPA | Dents And More | Atlanta, GA | | |
| | Front Bumper Brkt. | FBB5568 | Reliance OEM | 00376FA11h | Reliance OEM | Dents And More | Atlanta, GA | | |
| | Bumper Brace | BB5568 | Reliance OEM | 00359FA77h | Reliance OEM | Dents And More | Atlanta, GA | | |
| 2-16-2015 | Left Fender | LF4897t | Generic Panels | 22ED33DF3h | Parts Express | Top Notch Body | Tampa, FL | | |
| | Left Door Skin | LD4897t | Generic Panels | 22FD96FA1h | Parts Express | Top Notch Body | Tampa, FL | | |
| | Lower Door Clad. | LDC4897t | Generic Panels | 22B800AA2h | Parts Express | Top Notch Body | Tampa, FL | | |
| | Left Fender Trim | LFT4897t | Generic Panels | 22CD59AB3h | Parts Express | Top Notch Body | Tampa, FL | | |
| | Lower Door Trim | LDT4897t | Generic Panels | 22DF84CC4h | Parts Express | Top Notch Body | Tampa, FL | | |
| No Record | Front Bumper | RB4556 | Exact Match | 33D25FE43h | No Record | No Record | No Record | | |
| No Record | Bumper Shk. Abs. | BSA45 | Monroe | 044FFAF32h | No Record | No Record | No Record | | |

*FIGURE 13*

SYSTEMS AND METHODS FOR HIT AND RUN DETECTION BASED ON INTELLIGENT MICRO DEVICES

CROSS REFERENCE TO RELATED APPLICATIONS

This application is a Continuation of U.S. patent application Ser. No. 13/526,086, filed on Jun. 18, 2012, titled "Systems and Methods for Hit and Run Detection based on Intelligent Micro Devices," which is a Continuation of U.S. patent application Ser. No. 12/250,030, now U.S. Pat. No. 8,203,425, entitled "Systems and Methods for Run Detection Based on Intelligent Micro Devices," by inventors Reynaldo Medina and Michael P. Bueche, Jr., filed on Oct. 13, 2008, both of which describe exemplary methods and systems and are incorporated by reference in its entirety.

U.S. patent application Ser. No. 12/250,028, entitled "Systems and Methods for Run Detection Based on Intelligent Micro Devices," by inventors Reynaldo Medina and Michael P. Bucche, Jr., filed on Oct. 13, 2008, describes exemplary methods and systems and is incorporated by reference in its entirety.

U.S. patent application Ser. No. 12/250,031, entitled "Systems and Methods for Run Detection Based on Intelligent Micro Devices," by inventors Reynaldo Medina and Michael P. Bueche, Jr., filed on Oct. 13, 2008, describes exemplary methods and systems and is incorporated by reference in its entirety.

BACKGROUND

Field of the Disclosure

Embodiments of the disclosure relate in general to the field of computers and similar technologies, and in particular to software utilized in this field. Still more particularly, it provides a system, method, and computer-usable medium for providing information relating to damage incurred by a vehicle in an accident.

Description of the Related Art

Automobile accidents are an all too common and unfortunate fact of life. In 2005, there were over 6,400,000 automobile accidents in the United States resulting in a financial cost of more than 230 billion dollars. In addition, 2.9 million people were injured and over 42,000 fatalities occurred in the same year. Currently, over 100 people die every day in the United States due to vehicle crashes, equating to one death every 13 minutes.

Being involved in an automobile accident can be traumatic, with reactions ranging from poor concentration, nervousness, anxiety, irritability, to agitation, or even being in a state of shock. As a result, the scene of an accident can be confusing to all involved, including eyewitnesses. Recalling what was seen and said, by whom and in what context, can prove problematic under the best of circumstances. Witnesses' memories fade as time passes, and the details of the accident become vague. In some cases, a witness may even begin to rationalize what they believe they may or may not have witnessed. In addition, investigation of automobile accidents is often hampered by lack of evidence, especially in the case of a bit-and-run accident involving two automobiles. Even if eyewitnesses happen to be present, their recollections may be unreliable. In other cases, there are no eyewitnesses at all, just damage to one or more vehicles, and in some cases, other property as well. All too often, there is no reliable way to identify the automobile that was the cause of the hit and run accident.

One issue relating to automobile accidents is the repair of damaged vehicles. Insurance claims adjusters are typically tasked with assessing the damage to a vehicle, determining a reasonable cost to repair, providing a financial settlement for the repairs, and then certifying that the repairs were performed properly using legitimate parts. However, unscrupulous body shops have been known to use counterfeit parts to increase their profits. In some cases, the substitution of these counterfeit parts is not immediately apparent, but their use soon leads to dissatisfaction with the repairs. While such cases may be the exception, the traffic in counterfeit body parts is not inconsequential. In 1997, the Federal Trade Commission estimated that counterfeiting cost the global auto industry $12 billion, $3 billion of which is in the United States. It is the consensus of aftermarket parts manufacturers that those estimates are far too conservative today. Worse yet are cases where the perpetrator of a hit and run accident, or an auto body repair shop, attempts to hide evidence of damage to the perpetrator's vehicle, which is a criminal act. Another related issue is the sale of repaired vehicles that have been damaged in an accident. In general, repairs of a damaged vehicle are reported and subsequently disclosed to a potential buyer by the seller. Currently, services such as CARFAX® provide a history of accident repairs and related information to prospective buyers of an automobile. However, such services are only as good as the information they are provided. Furthermore, not all accident repairs are properly reported or recorded. Even when they are, there is no way for the buyer to verify the provenance of the body parts used to repair the automobile.

BRIEF SUMMARY

A system, method, and computer-usable medium are disclosed for providing information relating to damage incurred by a vehicle in an accident. In various embodiments, a plurality of markers is embedded in a coating applied to a component of a vehicle. As used herein, a marker is defined as any apparatus or group of technologies that comprises an identifier that can be read by a reader. In various embodiments, the identifier of the marker may be a visual identifier such as a two dimensional barcode, an electromagnetic identifier, an electro luminescent identifier, or a carbon nanotube signature. In one embodiment, the marker comprises a radio frequency identification (RFID) tag that can be read by an RFID tag reader. Likewise, a vehicle component is defined as any individual part of, or sub-assembly of a vehicle, including but not limited to internal and external body panels, structural and suspension components, and mechanical assemblies such as a drivetrain. In one embodiment, a plurality of markers is randomly applied to a vehicle component. In another embodiment, a plurality of markers is suspended within a coating, which is then applied to a component of a vehicle. In yet another embodiment, each of a plurality of markers are applied to a predetermined location of a component of a vehicle and a coating is then applied to embed the markers in the coating.

In various embodiments, a first plurality of markers is embedded in a coating applied to a component of a first vehicle and a second plurality of markers is embedded in a coating applied to a component of a second vehicle. In these and other embodiments, the first vehicle may strike the second vehicle in the course of an accident. In the case of a hit-and-run accident, the first vehicle may leave the scene of the accident. In one embodiment, markers from the first vehicle are left at the scene of the accident. In another embodiment, one or more markers from the first vehicle become transferred markers upon impact with the second vehicle. In one embodiment, markers from the first vehicle left at the scene of the accident are read with a portable or handheld marker reader operated by an accident investigator. In another embodiment, the second vehicle is passed through a stationary marker reader to read the transferred markers from the first vehicle. The marker identifiers read by the marker readers are then processed by a vehicle marker processing system, which comprises a marker analysis module.

In various embodiments, the vehicle marker processing system accesses one or more information repositories to determine the identity of the first vehicle. In one embodiment, prior damage and any related repairs to the second vehicle is determined by reading the identifier of the second vehicle's markers, which are then used to query a vehicle history system comprising a vehicle repair history information repository. In one embodiment, the vehicle history information repository comprises repair history information cross-referenced to component information provided by one or more vehicle component manufacturers, each of which maintains a vehicle component information repository. In another embodiment, the vehicle marker processing system may access one or more vehicle component information repositories and cross-reference the information they provide to the information provided by the vehicle history system. In one embodiment, the information provided by each of the vehicle component information repositories is certified by a component certification system, which in turn comprises a component certification module and a component certification information repository. By comparing the information provided by the vehicle history system to the marker identifiers read by the marker readers, the vehicle marker processing system can differentiate between reported damage and repairs and apparent new damage caused by the first vehicle.

BRIEF DESCRIPTION OF THE DRAWINGS

Selected embodiments of the disclosure may be understood, and its numerous objects and features obtained, when the following detailed description is considered in conjunction with the following drawings, in which:

FIG. 13 is a generalized illustration of a vehicle repair history as implemented in accordance with an embodiment of the invention.

DETAILED DESCRIPTION

Figure 1:
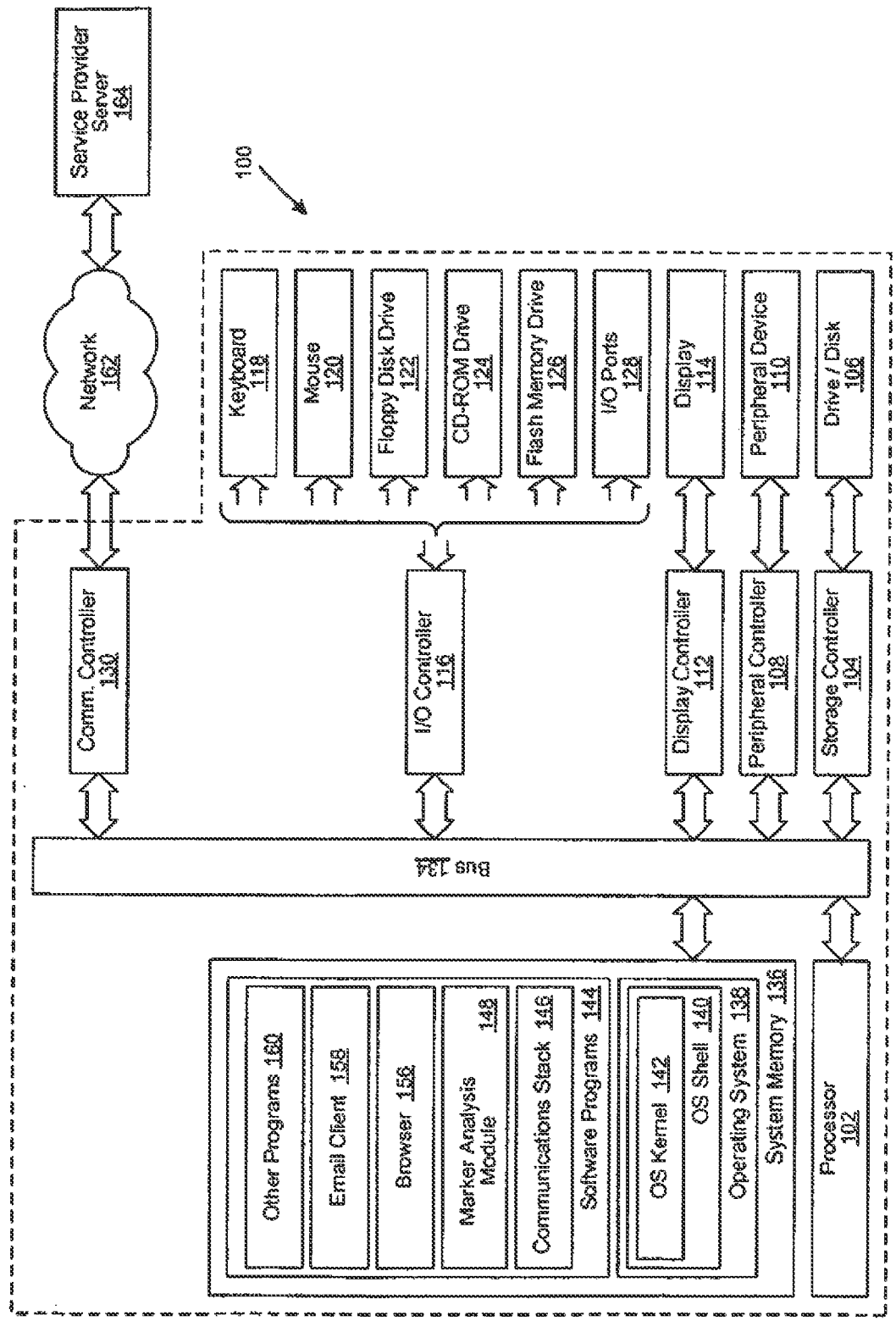
FIG. 1 depicts an exemplary client information processing system (IPS) in which embodiments of the disclosure may be implemented.

A method, system and computer-usable medium are disclosed for providing information relating to damage incurred by a vehicle in an accident. As will be appreciated by one skilled in the art, the disclosure may be embodied as a method, system, or computer program product. Accordingly, various embodiments may be implemented entirely in hardware, entirely in software (including firmware, resident software, micro-code, etc.) or in an embodiment combining software and hardware. These various embodiments may all generally be referred to herein as a "circuit," "module," or "system."

For purposes of this disclosure, an information processing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information processing system may be a personal computer, a personal digital assistant (PDA), a wirelessly-enabled mobile telephone, a server, a network storage device, or any other suitable device and may vary in size, shape, performance, functionality, and price. The information processing system may include random access memory (RAM), one or more processing resources such as a central processing unit (CPU) or hardware or software control logic, read only memory (ROM), and/or other types of nonvolatile memory. Additional components of the information processing system may include one or more disk drives, one or more network ports for communicating with external devices, as well as various input and output (I/O) devices, such as a keyboard, a mouse, and a video display. The information processing system may also include one or more buses operable to transmit communications between the various hardware components.

Additionally, various embodiments may take the form of a computer program product on a computer-usable storage medium having computer-usable program code embodied in the medium. Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. A non-exhaustive list of more specific examples of the computer-readable medium would include the following: an electrical connection having one or more wires, an optical fiber, a transmission media such as those supporting the Internet or an intranet, a random access memory (RAM), a read-only memory (ROM), an erasable programmable read-only memory (EPROM or Flash memory), a magnetic storage device, a portable computer diskette, a hard disk, an optical storage device, a portable compact disc read-only, memory (CD-ROM), or a digital versatile disk (DVD). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, wireless, radio frequency (RF), etc.

Computer program code for carrying out operations in various embodiments may be written in an object oriented programming language such as Java, Smalltalk, C++ or the like. However, the computer program code for carrying out operations in various embodiments may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a wireless local area network (WLAN), a wireless wide area network (WWAN), a or personal area network (PAN). In addition, the connection may be made to an external computer (for example, through the Internet using an Internet Service Provider) using any combination of telecommunication technologies and protocols operable to establish a network connection for the exchange of information.

Embodiments of the disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer, information processing system, or other programmable data processing apparatus, to function in a particular manner such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a generalized block diagram of an exemplary client information processing system (IPS) 100 in which various embodiments may be utilized. Client IPS 100 includes a processor unit 102 that is coupled to one or more buses 134. A display controller 112, which controls a display 114, is also coupled to or more buses 134, along with peripheral controller 108, which controls one or more peripheral devices 110. An input/output (I/O) controller 116 affords communication with various I/O devices, including a keyboard 118, a mouse 120, a floppy disk drive 122, a Compact Disk-Read Only Memory (CD-ROM) drive 124, a flash drive memory 126, and one or more I/O ports 128. The format of the ports connected to the 1/O controller 116 may be any known to those skilled in the art of computer architecture, including but not limited to Universal Serial Bus (USB) ports.

Client IPS 100 is able to communicate with a service provider server 164 via a network 162 using a communications controller 130, which is coupled to one or more buses 134. Network 162 may be the public switched telephone network (PSTN), an external network such as the public Internet, an internal network such as an Ethernet-based local area network (LAN), a Virtual Private Network (VPN) such as a corporate intranet, or any combination of telecommunication technologies and protocols operable to establish a network connection for the exchange of information. Using network 162, client IPS 100 is able to access service provider server 164.

A storage controller 104 is also coupled to one or more buses 134. Storage controller 104 interfaces with storage disk or drive 106, which may comprise a magnetic storage device such as a hard disk or tape drive. In various embodiments, storage disk or drive 106 populates a system memory 136, which is also coupled to one or more buses 134. Data that populates system memory 136 includes the client IPS 100 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX@), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, various embodiments may also support other user interface modes, such as graphical, voice, gestural, etc. As depicted, OS 138 also includes kernel 142, which includes lower levels of functionality for OS 138, including services used by other parts of OS 138 and software programs 144, including memory management, process and task management, disk management, and mouse and keyboard management.

Software programs 144 may include a communications stack 146, browser 156, email client 158, and other programs 160. The communications stack 146 is operable to implement any communication protocol enabling various embodiments of the disclosure. Browser 156 includes program modules and instructions enabling a World Wide Web (WWW) client (i.e., IPS 100) to send and receive network messages to the Internet using HyperText Transfer Protocol (HTTP) messaging, thus enabling communication with service provider server 164. Software programs 144 also include a marker analysis module 148. The marker analysis module 148 includes computer executable instructions for implementing the processes described in FIGS. 2-13 described hereinbelow. In one embodiment, client IPS 100 is able to download the computer executable instructions of the marker analysis module 148 from a service provider server 164 located at a remote location. In another embodiment, the computer executable instructions of the marker analysis module 148 are provided by a service provider as a service, such as a Web service implemented on a Service-Oriented Architecture (SOA), to the client IPS 100 on an on-demand basis.

The hardware elements depicted in client IPS 100 are not intended to be exhaustive, but rather are representative to highlight components used by the disclosure. For instance, client IPS 100 may include alternate memory storage devices such as magnetic cassettes, Digital Versatile Disks (DVDs), Bernoulli cartridges, and the like. These and other variations are intended to be within the spirit and scope of the disclosure.

Figure 2:
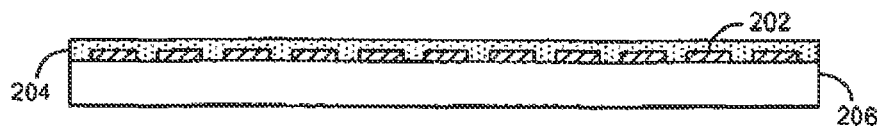
FIG. 2 is a simplified illustration of a plurality of markers embedded in a coating applied to a vehicle component in accordance with an embodiment of the disclosure.

FIG. 2 is a simplified illustration of a plurality of markers 202 embedded in a coating 204 applied to a vehicle component 206 in accordance with an embodiment of the disclosure. In various embodiments, a plurality of markers 202 are embedded in a coating 204 applied to a component 206 of a vehicle. As used herein, a marker is defined as any apparatus or group of technologies that comprises an identifier that can be read by a reader. In various embodiments, the identifier of the marker may be a visual identifier such as a two dimensional barcode, an electromagnetic identifier, an electro luminescent identifier, or a carbon nanotube signature. Many such embodiments are possible and the foregoing are presented as examples and are not intended to limit the spirit, scope, or intent of the disclosure.

In one embodiment, the marker 202 comprises a radio frequency identification (RFID) tag that can be read by an RFID tag reader. In various embodiments, the RFID may be passive, active, or semi-passive. Passive RFID tags have no internal power supply. Instead, an electrical current induced in the RFID's antenna provides power to transmit a response. Passive RFID tags typically have a practical read distance of approximately four inches. Currently, micro RFID tags are available that measure as small as 0.05×0.05 mm. It will be apparent to those of skill in the art that such micro RFID tags are suitable for inclusion in the coating of a vehicle component, in a fashion similar to how metal flakes are suspended in the color coat of an automobile's finish. In contrast, an active RFID tag has its own power source and may transmit at higher power levels than passive RFID tags. Currently, active RFID tags implement batteries that have a life expectancy of up to ten years. In various embodiments, active RFID tags (e.g., 202) are embedded within a coating 204 applied to a component 206 of a vehicle. Semi-passive RFID tags also have their own power source, but the battery only powers the RFID tag's microchip and is not used for broadcasting of a signal. As with passive RFID tags, the power to broadcast a signal is received from the RF energy emitted by an RFID tag reader. As likewise used herein, a marker reader is defined herein as any apparatus or group of technologies that are operable to read an identifier associated with a marker. Likewise, a vehicle component is defined as any individual part of, or sub-assembly of a vehicle, including but not limited to internal and external body panels, structural and suspension components, and mechanical assemblies such as a drivetrain.

Figure 3:
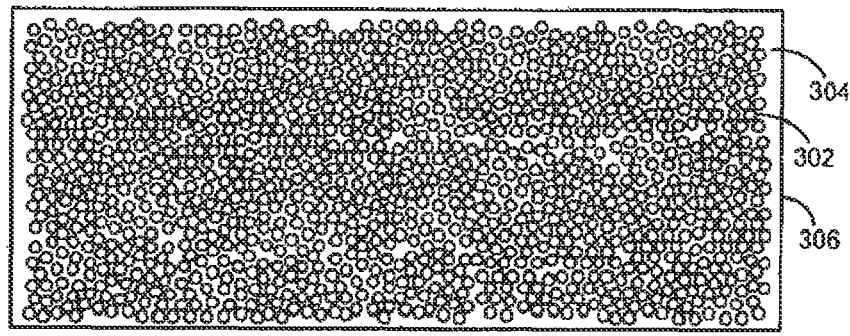
FIG. 3 is a simplified illustration of a plurality of markers randomly applied to a vehicle component in accordance with an embodiment of the disclosure.

FIG. 3 is a simplified illustration of a plurality of markers 302 randomly applied to a vehicle component 306 in accordance with an embodiment of the disclosure. In this embodiment, a plurality of markers 302 is suspended within a coating 304, which is then applied to a component 306 of a vehicle. It will be appreciated that the application of the coating 304 to the vehicle component 306 would result in the plurality of markers 302 being embedded within the coating 304.

Figure 4:
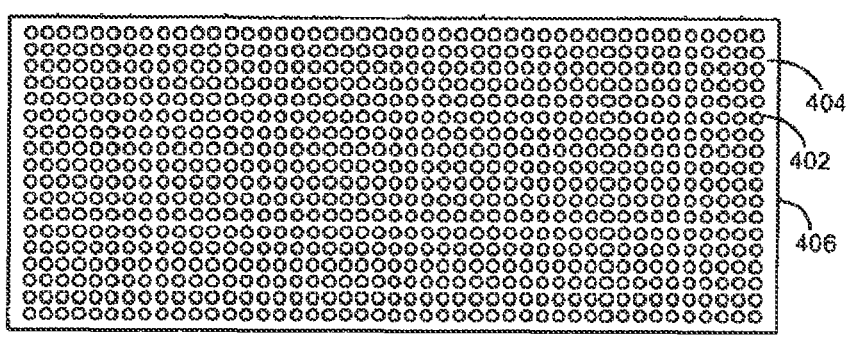
FIG. 4 is a simplified illustration of a plurality of markers applied to a predetermined location on a vehicle component in accordance with an embodiment of the disclosure.

FIG. 4 is a simplified illustration of a plurality of markers 402 applied to a predetermined location on a vehicle component 406 in accordance with an embodiment of the disclosure. In this embodiment, each of a plurality of markers 402 are applied to a predetermined location of a component 406 of a vehicle and a coating 404 is then applied. Skilled practitioners of the art will realize that the application of a coating 404 after the plurality of markers 402 are applied to their respective predetermined locations will embed the plurality of markers 402 within the coating 404. In one embodiment, each of the plurality of markers 402 has a unique identifier.

Figure 5:
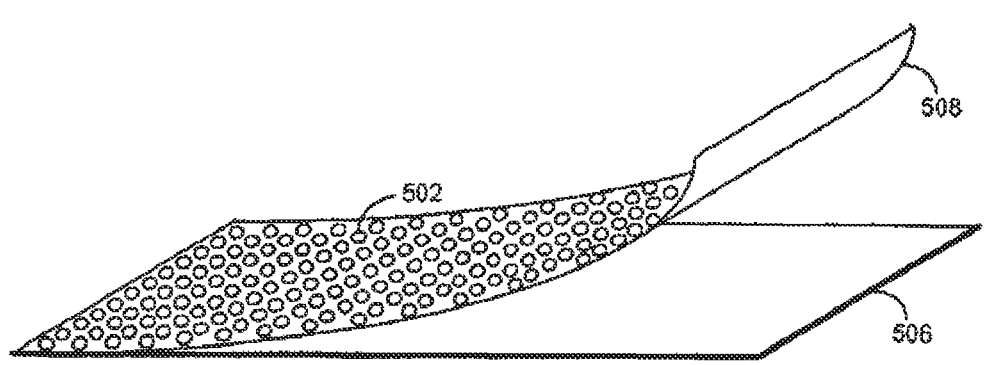
FIG. 5 is a simplified illustration of the application of a plurality of markers applied to a predetermined location on a vehicle component in accordance with an embodiment of the disclosure.

FIG. 5 is a simplified illustration of the application of a plurality of markers 502 applied to a predetermined location on a vehicle component 506 in accordance with an embodiment of the disclosure. In this embodiment, a plurality of markers 502 are transferred to a plurality of predetermined locations on a component 506 of a vehicle through the implementation of a transfer sheet 508. Subsequent to their application, a coating is applied to the component 506, thereby embedding the plurality of markers 502 within the coating.

Figure 6:
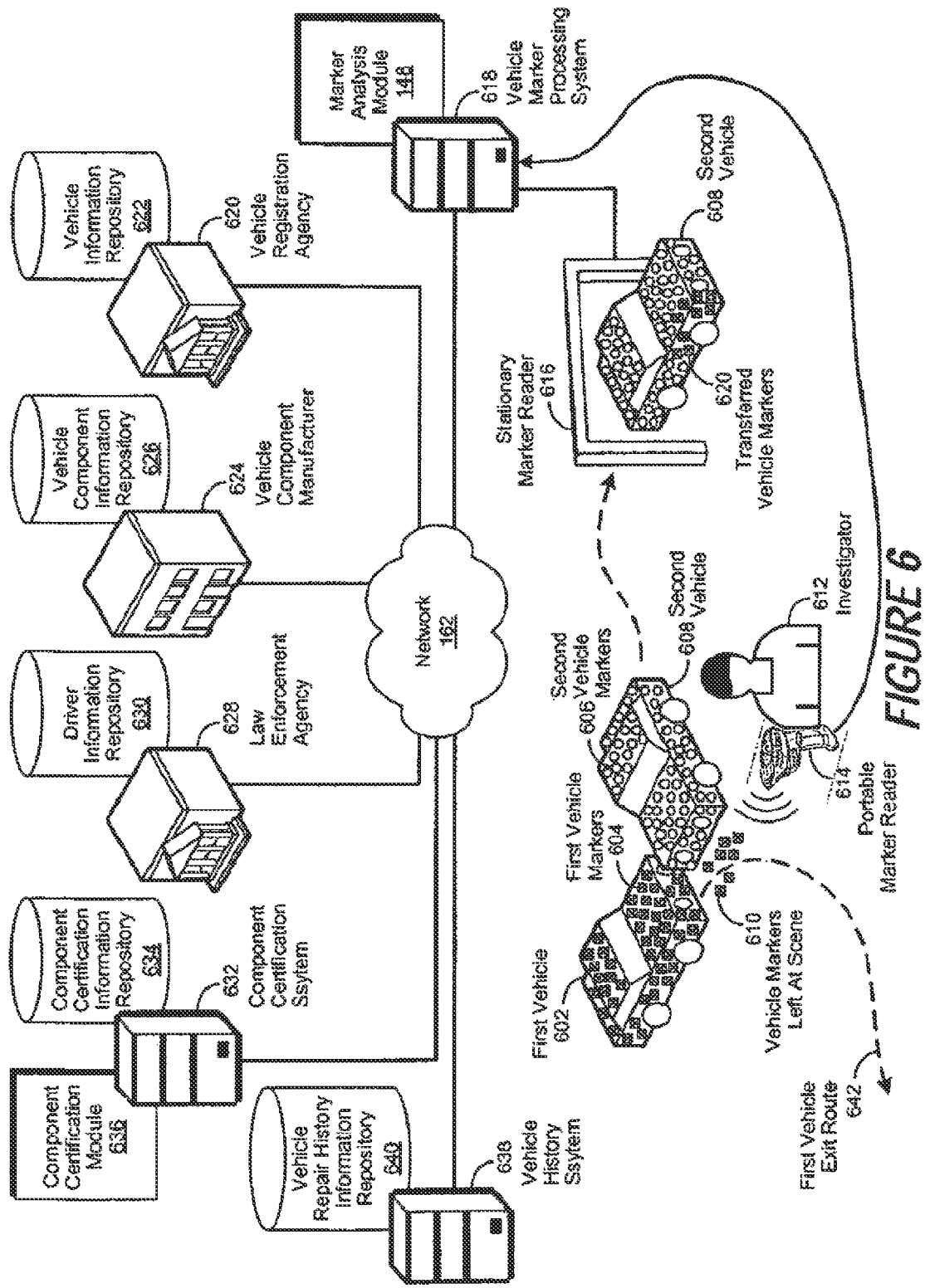
FIG. 6 is a simplified illustration of a vehicle marker processing system as implemented in accordance with an embodiment of the disclosure.

FIG. 6 is a simplified illustration of a vehicle marker processing system 618 as implemented in accordance with an embodiment of the disclosure. In various embodiments, a first plurality of markers 604 is embedded in a coating applied to a component of a first vehicle 602 and a second plurality of markers 608 is embedded in a coating applied to a component of a second vehicle 608. In these and other embodiments, the first vehicle 602 may strike the second vehicle 608 in the course of an accident. In the case of a hit-and-run accident, the first vehicle 602 may leave 642 the scene of the accident. In one embodiment, markers 610 from the first vehicle 602 are left at the scene of the accident. In another embodiment, one or more markers 604 from the first vehicle 602 become transferred markers 620 upon impact with the second vehicle 608. In one embodiment, markers 610 from the first vehicle 602 left at the scene of the accident are read with a portable or handheld marker reader 614 operated by an accident investigator 612. In another embodiment, the second vehicle 608 is passed through a stationary marker reader 616 to read the transferred markers 620 from the first vehicle 602.

The marker identifiers 610 are read by the portable marker reader 614 and the transferred markers 620 read by the stationary marker reader 616 are then processed by a vehicle marker processing system 618, which comprises a marker analysis module 148. In various embodiments, the vehicle marker processing system 618 accesses one or more information repositories to determine the identity of the first vehicle 602. As an example, the vehicle marker processing system 618 may access a vehicle information repository 622 operated by a vehicle registration agency, or a driver information repository 630 operated by a law enforcement agency 628. In one embodiment, prior damage and any related repairs to the second vehicle 608 is determined by reading the identifier of the second vehicle's markers 606, which are then used to query a vehicle history system 638, which comprises a vehicle repair history information repository 640. In one embodiment, the vehicle history information repository 640 comprises repair history information cross-referenced to component information provided by one or more vehicle component manufacturers 624, each of which maintains a vehicle component information repository 626. In another embodiment, the vehicle marker processing system 618 may use network 162 to access one or more vehicle component information repositories 626 and cross-reference the information they provide to the information provided by the vehicle history system 638. In one embodiment, the information provided by each of the vehicle component information repositories 626 is certified by a component certification system 632, which in turn comprises a component certification module 636 and a component certification information repository 634. By comparing the information provided by the vehicle history system 638 to the marker identifiers 610, 620 read by marker readers 614, 616, the vehicle marker processing system 618 can differentiate between reported damage and repairs and apparent new damage caused by the first vehicle 602.

Figure 7:
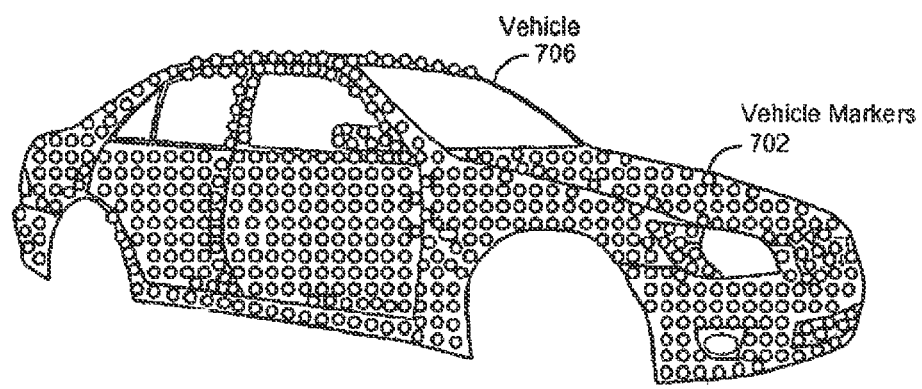
FIG. 7 is a simplified illustration of a plurality of markers embedded in a coating applied to a plurality of vehicle components in accordance with an embodiment of the disclosure.

FIG. 7 is a simplified illustration of a plurality of markers 702 embedded in a coating applied to a plurality of vehicle 706 components in accordance with an embodiment of the disclosure. In this embodiment, a plurality of markers 702 is applied to a plurality of components of vehicle 706. In one embodiment, the identifier of each of the plurality of markers is indexed to information related to the vehicle 706. As an example, information relating to the vehicle 706 may comprise a Vehicle Identification Number (VIN), which in turn is related to other information related to the vehicle, such as its registered owner, its date of manufacture, as well as its make and model. In one embodiment, a database comprises such information related to the vehicle 706, which in turn is indexed to at least one identifier of the plurality of markers 702. In another embodiment, each of the plurality of markers 702 applied to each individual component of the vehicle 706 has the same identifier. In yet another embodiment, the plurality of markers 702 applied to each individual component of the vehicle 706 has a different identifier. In still another embodiment, each of the plurality of markers 702 applied to each individual component of the vehicle 706 has a unique identifier.

Figure 8:
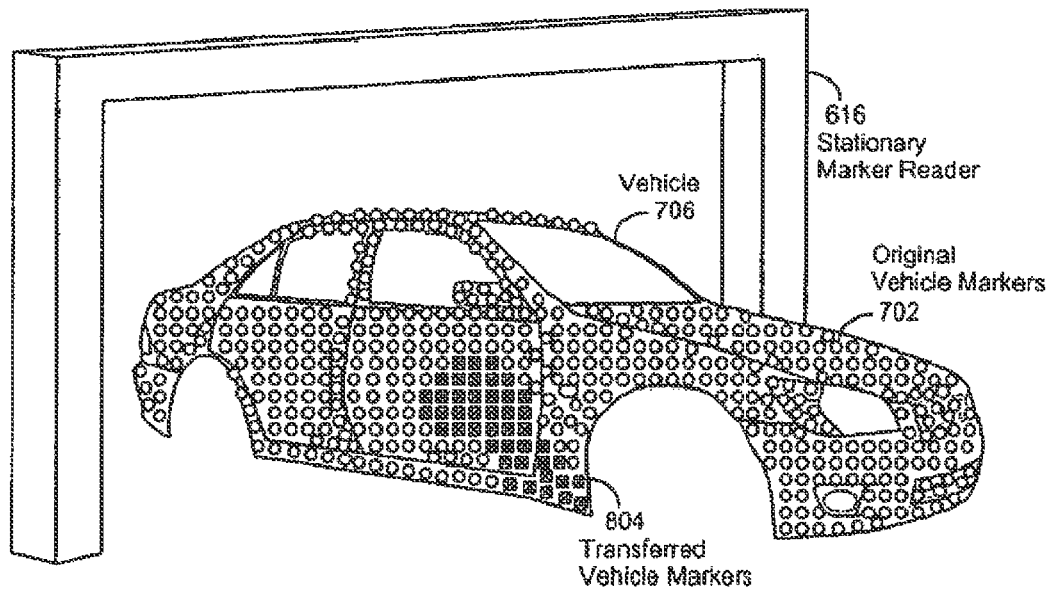
FIG. 8 is a simplified illustration of a stationary marker reader as implemented in an embodiment of the disclosure.

FIG. 8 is a simplified illustration of a stationary marker reader 616 as implemented in an embodiment of the disclosure. In this embodiment, a vehicle 706 that was involved in an accident with another vehicle is passed through a stationary marker reader 616. As the vehicle 706 is passed through the stationary maker reader 616, the identifiers of both the vehicle's original markers 702 and the identifiers of any transferred markers 804 are read. In one embodiment, the stationary marker reader 616 is implemented to map the location of an identifier associated with an original marker 702, and the location of an identifier associated with a transferred marker 804, on a component of the vehicle 706. In another embodiment, the mapping of the identifier associated with an original marker 702 in relation to the location of an identifier associated with a transferred marker 804 provides information relating to the accident the vehicle 706 was involved in. As an example, the vehicle 706 may have been involved in a hit-and-run accident that was caused by another vehicle. It will be appreciated that in many cases it would be difficult to determine the identity of the vehicle that caused the accident if there were no eyewitnesses. However, if the vehicle causing the accident comprised markers embedded within a coating of its components, then some of the markers may be transferred to the other vehicle at the time of impact. The identifiers of these transferred markers 804 are then read by the stationary marker reader 616. In one embodiment, a database comprises information relating to vehicles, which in turn is indexed to the identifiers of markers applied to their respective components. Accordingly, the identity of the vehicle causing the hit-and-run accident can be determined by querying the database with the identifier of a transferred marker 804.

In one embodiment, the vehicle is scanned at predetermined intervals and the results of the scan are compared to the results of prior scans to determine if there has been unreported damage to the vehicle between scans. As an example, a vehicle may be scanned during a yearly inspection and the results compared to the results of the last yearly scan of the vehicle. The results of the comparison can then be compared to a database of reported damage or repairs. It will be appreciated that scans indicating unreported damage or repairs may provide the basis for further investigation into the reason for the damage or repairs not being reported.

Figure 9:
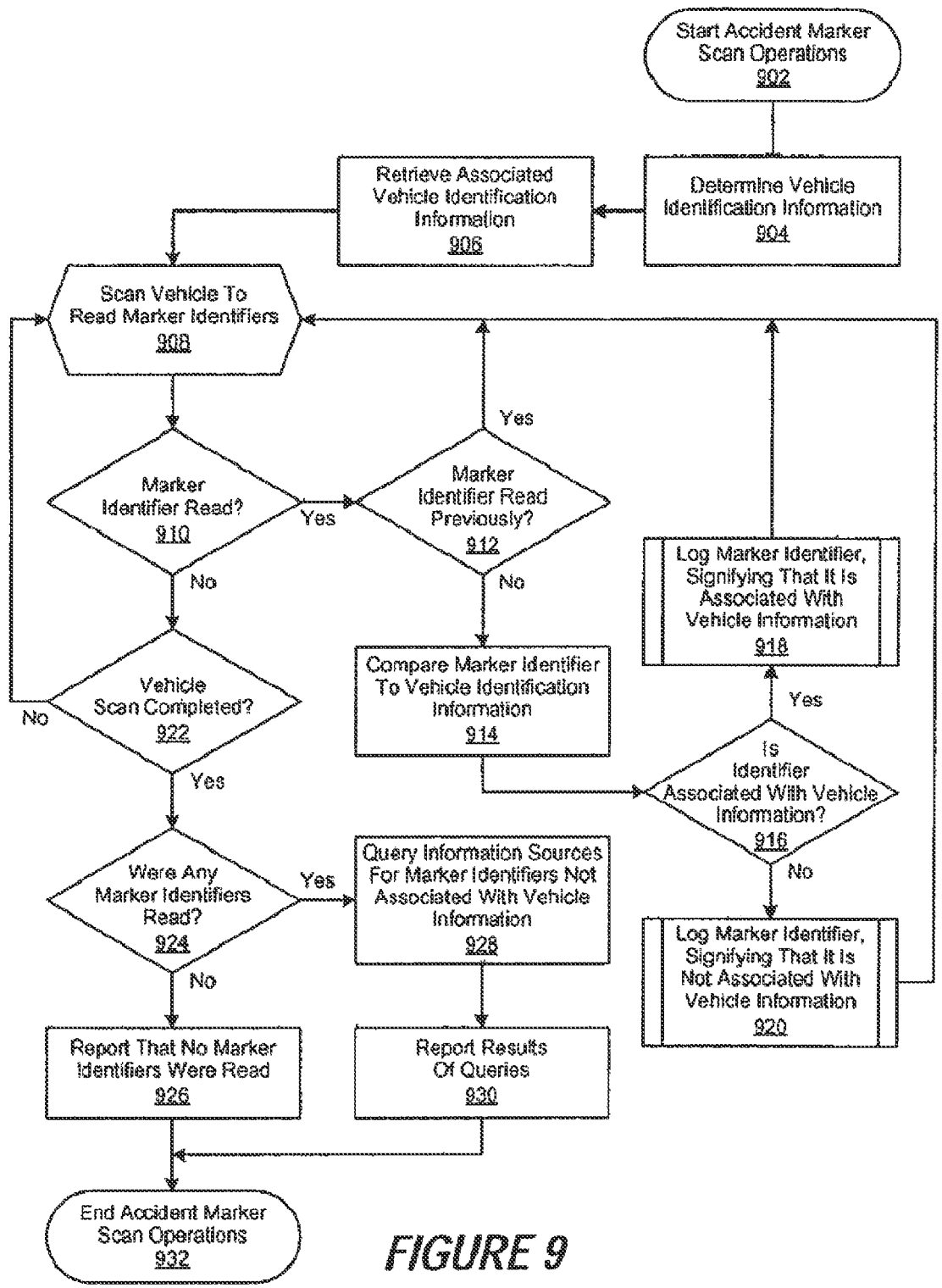
FIG. 9 is a generalized flowchart of the operation of a vehicle marker processing system as implemented in accordance with an embodiment of the disclosure to provide vehicle accident information.

FIG. 9 is a generalized flowchart of the operation of a vehicle marker processing system as implemented in accordance with an embodiment of the disclosure to provide vehicle accident information. In this embodiment, accident marker scan operations are begun in block 902, followed by determining vehicle identification information in block 904. As an example, the Vehicle Identification Number (VIN), license plate number, or vehicle registration information may be determined. The vehicle information is then used in block 906 to retrieve associated vehicle identification information. As an example, the VIN may be used to query a database containing vehicle owner identity information. In one embodiment, a database comprises vehicle information that is indexed to the identifier of markers applied to its respective components. The vehicle is then scanned with a marker reader in block 908 as described in greater detail herein to read the identifiers of markers embedded in coatings applied to a component of the vehicle. In one embodiment, a stationary marker reader is implemented to read marker identifiers. In another embodiment, a portable or handheld marker reader is implemented to read marker identifiers. A determination is then made in block 912 whether the marker identifier has been previously read. As an example, multiple markers may have the same identifier, all associated with a predetermined vehicle's information. As another example, each of the markers applied to an individual component of a vehicle may have the same identifier. As yet another example, the identifier of an individual marker may have already been read.

If it is determined in block 912 that the identifier of a marker has been previously read, then the process continues, proceeding with block 908. Otherwise, the identifier of the marker is compared to the previously determined vehicle identification information in block 914. A determination is then made in block 916 whether the read identifier is associated with the vehicle being scanned. If so, then the identifier of the marker is logged in block 918, signifying that it is associated with the vehicle being scanned, and the process continues, proceeding with block 908. Otherwise, the identifier of the marker is logged in block 920, signifying that it is not associated with the vehicle being scanned, and the process continues, proceeding with block 908.

However, if it is determined in block 910 that a marker identifier has been not been read, then a determination is made in block 922 whether scanning of the vehicle to read marker identifiers is complete. If not, the process continues, proceeding with block 908. Otherwise, a determination is made in block 924 whether any marker identifiers were read during the scanning operation. If not, then a report is generated in block 926 that no marker identifiers were read and accident marker operations are ended in block 932.

However, if it is determined in block 924 that marker identifiers were read, then information sources are queried in block 928 for marker identifiers not associated with identification information related to the vehicle being scanned. As an example, the vehicle being scanned may have been involved in a hit-and-run accident that was caused by another vehicle. If the vehicle causing the accident comprised markers embedded within a coating of its components, then some of the markers may have been transferred to the scanned vehicle at the time of impact. The identifiers of these transferred markers are then read by the marker reader. In one embodiment, a database comprises information relating to vehicles, which in turn is indexed to the identifiers of markers applied to their respective components. Accordingly, the identity of the vehicle causing the hit-and-run accident can be determined by querying the database with the identifier of a transferred marker. The results of the queries are then reported in block 930 and accident marker operations are ended in block 932.

Figure 10:
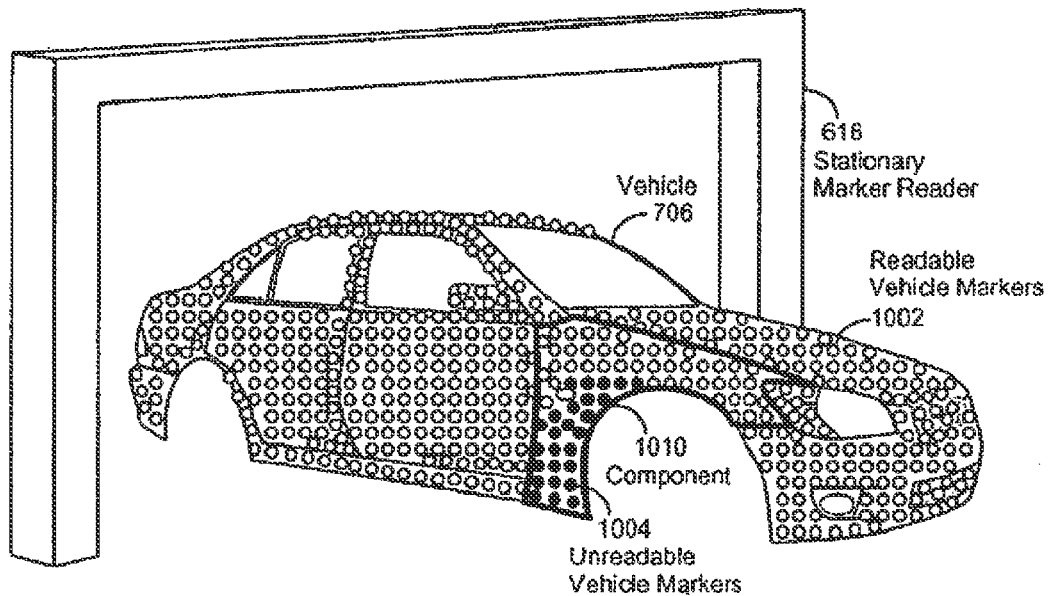
FIG. 10 is a simplified illustration of a stationary marker reader as implemented in an embodiment of the disclosure to detect prior vehicle repairs.

FIG. 10 is a simplified illustration of a stationary marker reader 616 as implemented in an embodiment of the disclosure to detect prior vehicle repairs. In this embodiment, a plurality of readable markers 1002 is applied to a plurality of components of vehicle 706. In one embodiment, the identifier of each of the plurality of markers is indexed to information related to the vehicle 706. As an example, information relating to the vehicle 706 may comprise a Vehicle Identification Number (VIN), which in turn is related to other information related to the vehicle, such as its registered owner, its date of manufacture, as well as its make and model. In one embodiment, a database comprises such information related to the vehicle 706, which in turn is indexed to at least one identifier of the plurality of readable markers 1002.

The vehicle 706 is then passed through a stationary marker reader 616. As the vehicle 706 is passed through the stationary maker reader 616, the identifiers of the plurality of readable markers 1002 are read and mapped to their location on vehicle component 1010. Unreadable markers 1004 are likewise mapped to their location on vehicle component 1010. In one embodiment, the mapping of the unreadable markers 1004 indicates a damaged, and subsequently repaired, area of component 1010. In another embodiment, the ratio of readable markers 1002 to unreadable markers 1004 indicates the percentage of component 1010 that was damaged and subsequently repaired. In yet another embodiment, the mapping of the unreadable markers 1004 in relation to the location of the plurality of readable markers 1002 provides information relating to an accident the vehicle 706 was involved in.

Figure 11:
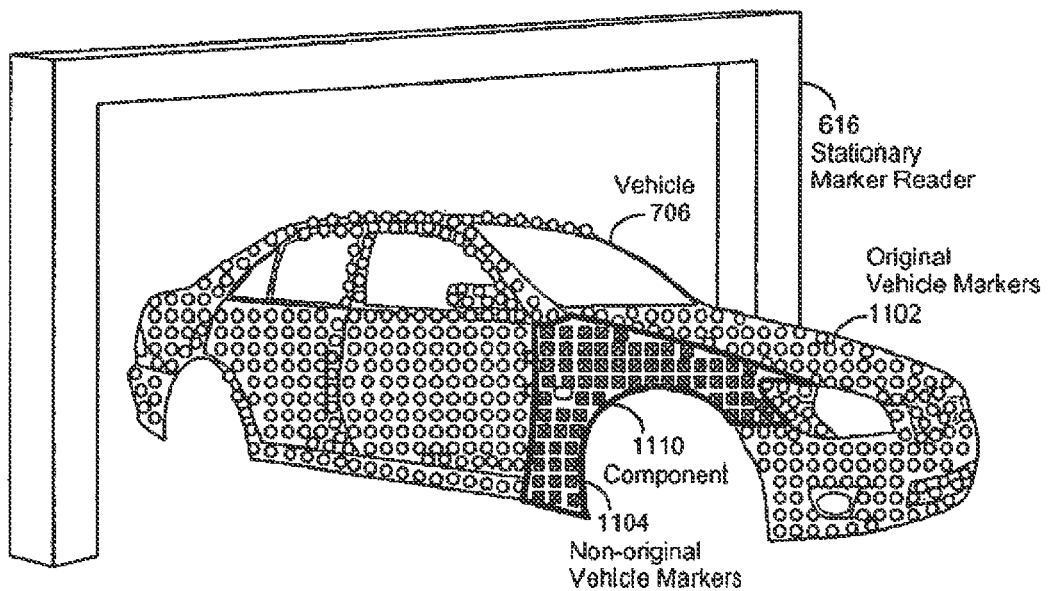
FIG. 11 is a simplified illustration of a stationary marker reader as implemented in an embodiment of the disclosure to verify vehicle repair history.

FIG. 11 is a simplified illustration of a stationary marker reader 616 as implemented in an embodiment of the disclosure to verify vehicle repair history. In this embodiment, a plurality of original markers 1102 is applied to a plurality of components of vehicle 706. In one embodiment, the identifier of each of the plurality of markers is indexed to information related to the vehicle 706. In one embodiment, a database comprises such information related to the vehicle 706, which in turn is indexed to at least one identifier of the plurality of original markers 1102.

The vehicle 706 is then passed through a stationary marker reader 616. As the vehicle 706 is passed through the stationary maker reader 616, the identifiers of the plurality of original markers 1102 are read and mapped to their location on vehicle 706. At the same time, the identifiers of non-original markers 1104, corresponding to vehicle component 1110, are likewise read and mapped to their location on vehicle 706. In one embodiment, the mapping of the non-original markers 1104 indicates that component 1110 is a replacement component as its identifiers are all associated with component 1110. In another embodiment, the ratio of original markers 1102 to non-original markers 1104 indicates the percentage of vehicle 706 that is not original. In yet another embodiment, the mapping of the non-original markers 1104 in relation to the location of the plurality of original markers 1102 provides information relating to an accident the vehicle 706 was involved in.

Figure 12:
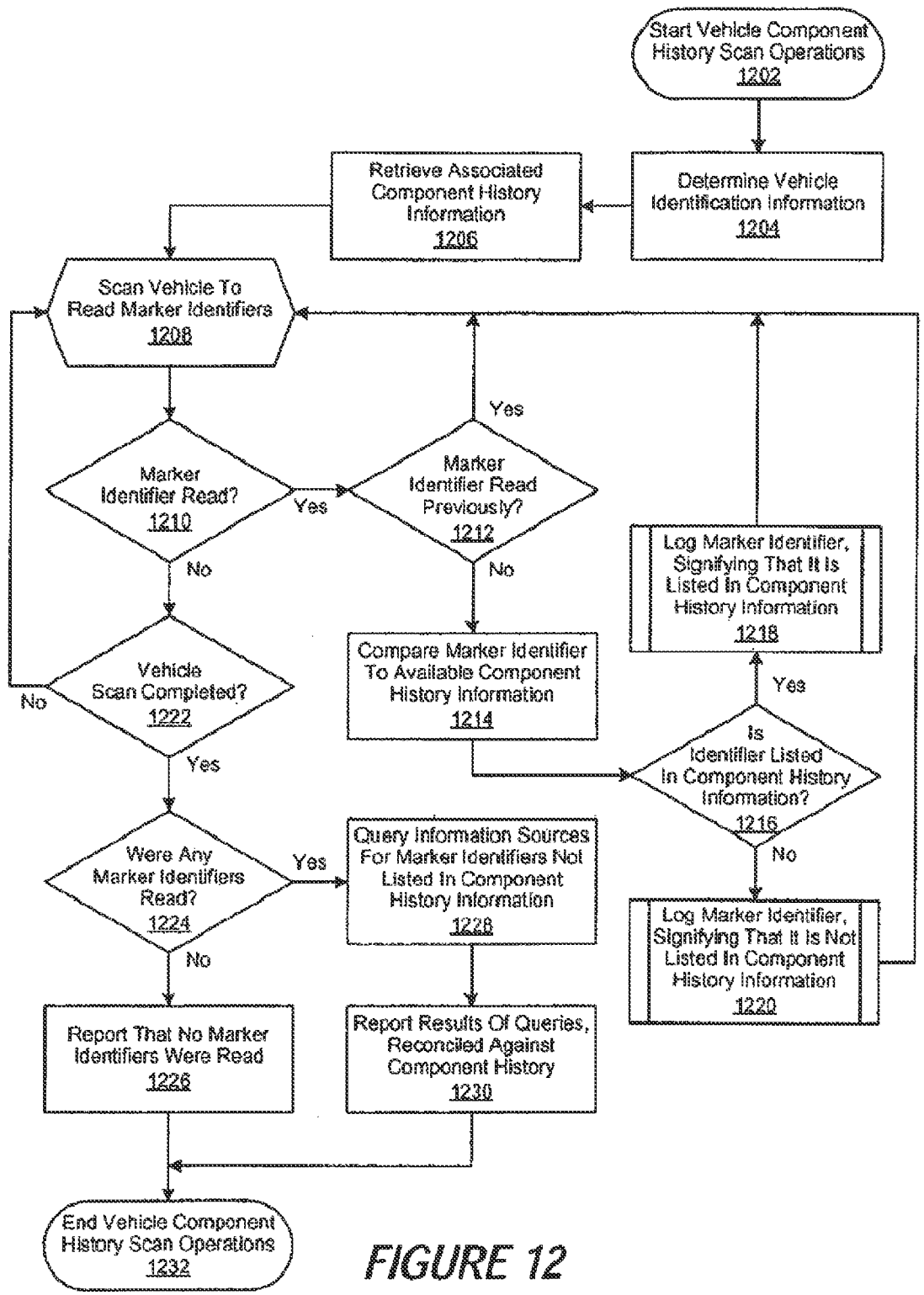
FIG. 12 is a generalized flowchart of the operation of a vehicle marker processing system as implemented in accordance with an embodiment of the disclosure to verify vehicle repair information.

FIG. 12 is a generalized flowchart of the operation of a vehicle marker processing system as implemented in accordance with an embodiment of the disclosure to verify vehicle repair information. In this embodiment, vehicle component history scan operations are begun in block 1202, followed by determining vehicle identification information in block 1204. As an example, the Vehicle Identification Number (VIN), license plate number, or vehicle registration information may be determined. The vehicle information is then used in block 1206 to retrieve associated component history information. As an example, the VIN may be used to query a database containing reported vehicle repair information which further comprises vehicle component information. In one embodiment, a database comprises vehicle component information that is indexed to the identifier of markers applied to its respective components. The vehicle is then scanned with a marker reader in block 1208 as described in greater detail herein to read the identifiers of markers embedded in coatings applied to a component of the vehicle. In one embodiment, a stationary marker reader is implemented to read marker identifiers. In another embodiment, a portable or handheld marker reader is implemented to read marker identifiers. A determination is then made is block 1212 whether the marker identifier has been previously read. As an example, multiple markers may have the same identifier, all associated with a predetermined vehicle component. As another example, the identifier of an individual marker may have already been read.

If it is determined in block 1212 that the identifier of a marker has been previously read, then the process continues, proceeding with block 1208. Otherwise, the identifier of the marker is compared to the previously determined vehicle component history information in block 1214. A determination is then made in block 916 whether the read identifier is listed in the component history information for the vehicle being scanned. If so, then the identifier of the marker is logged in block 918, signifying that it is listed in the component history information for the vehicle being scanned, and the process continues, proceeding with block 1208. Otherwise, the identifier of the marker is logged in block 920, signifying that it is not listed in the component history information for the vehicle being scanned, and the process continues, proceeding with block 1208.

However, if it is determined in block 1210 that a marker identifier has been not been read, then a determination is made in block 1222 whether scanning of the vehicle to read marker identifiers is complete. If not, the process continues, proceeding with block 1208. Otherwise, a determination is made in block 1224 whether any marker identifiers were read during the scanning operation. If not, then a report is generated in block 1226 that no marker identifiers were read and accident marker operations are ended in block 1232.

However, if it is determined in block 1224 that marker identifiers were read, then information sources are queried in block 1228 for marker identifiers not listed in the available component history information. As an example, a previous repair to the vehicle being scanned may not have been reported. By using the marker identifiers not listed in the available component history information for queries, additional information relating to the previous repair may be discovered and then appended to the available component history information. The results of the queries are then reported in block 1230, reconciled against the available component history information, and vehicle component history scan operations are ended in block 1232.

FIG. 13 is a generalized illustration of a vehicle repair history as implemented in accordance with an embodiment of the invention. In this embodiment, a vehicle repair history 1302 comprises vehicle and component information related to the identifier of a marker embedded within a coating applied to a component of a vehicle. The Vehicle Repair History 1302 comprises the year 1304 the vehicle was manufactured ("2009"), its manufacturer 1306 ("Reliance"), its model 1308 ("Impacta"), and its Vehicle Identification Number 1310 ("FJ235895KK4525L23"). The Vehicle Repair History 1302 likewise comprises date 1312 of reported repairs, repaired or replaced components 1314, the part number 1316 of each component, the manufacturer 1318 of the component, and the identifier 1320 of the marker embedded in a coating applied to the component. Likewise, the Vehicle Repair History 1302 comprises the supplier 1320 of the component, the name of the vehicle repair 1324 entity, and vehicle repair 1324 entity's location 1326. In various embodiments, the information contained in the Vehicle Repair History 1302 is generated by reading the identifiers of markers embedded in a coating applied to various components of a vehicle, and then indexing the read identifiers to related vehicle information as described in greater detail herein.

It will be apparent to those of skill in the art that the provision of a Vehicle Repair History 1302 provides a significant level of detail related to the repair history of a vehicle. As an example, the repair 1328 performed on Feb. 14, 2012 was performed by a dealer ("Memphis Reliance") of the vehicle manufacturer ("Reliance"), using parts manufactured ("Reliance OEM") by, or on behalf of, the manufacturer ("Reliance"). By examining the repair record 1330 performed on Feb. 15, 2012 it can be surmised that since there is only one days difference between repairs 1328 and 1330, and since they both took place in Memphis, Tenn., that the repair entity ("Alignment Plus") or repair 1330 was likely a subcontractor to Memphis Reliance.

As another example, the repair 1332 dated Jul. 8, 2014 indicates that an independent repair entity ("Dents And More") performed the repair using a non-OEM ("Exact Match") front bumper, a third party ("Monroe") manufacturer of the shock absorber, and OEM ("Reliance OEM") front bumper bracket and bumper brace. Likewise, the location 1326 of repair 1332 indicates that the repair was made in Atlanta, Ga. As yet another example, the repair 1334 dated Feb. 16, 2015 indicates that another independent repair entity ("Top Notch Body") performed the repair using a non-OEM ("Generic Panels") left fender, left door skin, lower door cladding, left fender trim, and lower door trim. Furthermore, all of the non-OEM components were supplied by Parts Express and the repair was performed in Tampa, Fla. Further examination of Vehicle Repair History 1302 indicates additional repairs 1336 were made, but not reported by the repair entity or the supplier of the components. However, the components that were replaced, and their respective part numbers, were determined by their corresponding marker identifiers. It will be appreciated that the level of detail embodied by such a Vehicle Repair History 1302 provides a comprehensive repair history of a vehicle, whether or not the repairs have been reported by the entity making the repairs.

The flowchart and block diagrams in the figures illustrate the architecture, functionality, and operation of possible implementations of systems, methods and computer program products according to various embodiments of the disclosure. Accordingly, each block in the flowchart or block diagrams may represent a module, segment, or portion of code, which comprises one or more executable instructions for implementing the specified logical function(s). In certain alternative implementations, the functions performed in a particular block may occur in an order that is different than what is noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "embodiment" can be used to describe any aspect, feature, process or step, any combination thereof, and/or any portion thereof, of the disclosure and should not be interpreted as limiting the scope of the application or claims.

While the disclosure has been described by reference to particular embodiments, such references do not imply a limitation and no such limitation is to be inferred. As such, the disclosure includes any and all embodiments having equivalent elements, modifications, omissions, combinations (e.g., of aspects across various embodiments), adaptations, alterations, and equivalents in form and function. As will be further appreciated by those skilled in the pertinent arts, the disclosure has a number of aspects and embodiments, and various embodiments may include overlapping features.

For example, the above-discussed embodiments may include software modules that include script, batch, or other executable files for the performance of certain tasks. These software modules may be stored on a machine-readable or computer-readable storage medium such as a disk drive. Storage devices used for storing software modules in accordance with various embodiments may include magnetic floppy disks, hard disks, or optical discs such as CD-ROMs or DVDs. A storage device used for storing firmware or hardware modules in accordance with an embodiment may also include a semiconductor-based memory, which may be permanently, removably or remotely coupled to a microprocessor/memory system. Thus, the software modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling submodules may be decomposed so that each submodule performs its function and passes control directly to another sub-module. In addition, each of the referenced components in this embodiment may be comprised of a plurality of components, each interacting with the other in a distributed environment. Furthermore, other embodiments may expand on the referenced embodiment to extend the scale and reach of the system's implementation.

The description of the disclosure has been presented for purposes of illustration and description, but is not intended to be exhaustive or limited in the form disclosed. It will be apparent to those of skill in the art that many modifications and variations are possible without departing from the scope and spirit of the disclosure, giving full cognizance to equivalents in all respects.

What is claimed is:

1. A non-transitory computer-readable medium storing instructions executable by a processor, the instructions causing the processor to:
   obtain first marker identification data corresponding to a first vehicle, wherein the first marker identification data includes vehicle identity data stored in a plurality of markers on the first vehicle,
      wherein a first one of the plurality of markers is a visual identifier comprising a carbon nanotube signature and indicating that the first one of the plurality of markers is associated with the first vehicle, and
      wherein a second one of the plurality of markers is associated with a second vehicle;
   correlate the first marker identification data corresponding to the first vehicle with second marker identification data in a database, the second marker identification data comprising data indexed to a plurality of vehicles, to provide identity information corresponding to the plurality of markers;
   determine a component of the first vehicle from where the first one of the plurality of markers was obtained;
   receive a vehicle repair history information of the first vehicle; and
   compare the first marker identification data and the vehicle repair history information to determine new damage to the component of the first vehicle caused by the second vehicle.

2. The non-transitory computer-readable medium of claim 1, wherein each of the plurality of markers that is applied to a particular component of the first vehicle has a like identifier.

3. The non-transitory computer-readable medium of claim 1, wherein the first marker identification data comprises a vehicle identification number (VIN).

4. A system for providing information relating to damage incurred by a first vehicle, comprising:
   a database comprising first marker identification data associated with a plurality of vehicles; and
   an analysis module configured to correlate second marker identification data corresponding to a first vehicle with the first marker identification data to provide identity information corresponding to the first vehicle;
   wherein the second marker identification data comprises data stored in a plurality of markers on the first vehicle, wherein a first one of the plurality markers is a visual identifier comprising a carbon nanotube signature, and
   wherein the second marker identification data indicates that the first one of the plurality of markers is associated with the first vehicle and a second one of the plurality of markers is associated with a second vehicle.

5. The system of claim 4, wherein each of the plurality of markers that is applied to a particular component of the first vehicle has a like identifier.

6. The system of claim 4, wherein the second marker identification data corresponding to the first vehicle comprises a vehicle identification number (VIN).

7. A non-transitory computer-readable medium storing instructions executable by a computer to:
   associate first identification data with a plurality of vehicles; and
   associate second identification data corresponding to a first vehicle with the first identification data to provide identity information corresponding to the first vehicle;
   wherein the second identification data comprises identity data stored in a plurality of markers on the first vehicle, wherein a first one of the plurality markers is a visual identifier comprising a carbon nanotube signature, and
   wherein the second identification data indicates that the first one of the plurality of markers is associated with the first vehicle and a second one of the plurality of markers is associated with a second vehicle.

8. The non-transitory computer-readable medium of claim 7, wherein each of the plurality of markers that is applied to a particular component of the first vehicle has a like identifier.

9. The non-transitory computer-readable medium of claim 7, wherein the first marker identification data comprises a vehicle identification number (VIN).

10. The non-transitory computer-readable medium of claim 1, wherein the first one of the plurality markers is embedded in a coating on the first vehicle.

11. The non-transitory computer-readable medium of claim 1, wherein the vehicle repair history information comprises at least one of a date of reported repairs, a name of repaired or replaced components, a part number of repaired components, or a manufacturer of repaired components.

12. The system of claim 4, wherein the first one of the plurality of markers is embedded in a coating on the first vehicle.

13. The system of claim 4, wherein the analysis module is further configured to:
   determine a component of the first vehicle from where the first one of the plurality of markers was obtained;

receive a vehicle repair history information of the first vehicle; and compare the second marker identification data and the vehicle repair history information to determine new damage to the component of the first vehicle caused by the second vehicle.

14. The system of claim 13, wherein the vehicle repair history information comprises at least one of a date of reported repairs, a name of repaired or replaced components, a part number of repaired components, or a manufacturer of repaired components.

15. The non-transitory computer-readable medium of claim 7, wherein the first one of the plurality of markers is embedded in a coating on the first vehicle.

16. The non-transitory computer-readable medium of claim 7, the instructions further comprising:

determine a component of the first vehicle on which the first one of the plurality of markers and was located;

receive a vehicle repair history information of the first vehicle, wherein the vehicle repair history information comprises one of a date of reported repairs, a name of repaired or replaced components, a part number of repaired components, or a manufacturer of repaired components; and compare the first identification data and the vehicle repair history information to determine new damage to the component of the first vehicle caused by the second vehicle.

\* \* \* \* \*